INVENTOR
ANTTI SUVANTO
AART VAN SANTEN
BY
Jennings Bailey Jr

United States Patent Office 3,697,375
Patented Oct. 10, 1972

3,697,375
FUEL ASSEMBLY FOR INSERTION FROM ABOVE INTO A NUCLEAR REACTOR CORE
Antti Suvanto and Aart van Santen, Vasteras, Sweden, assignors to Allmanna Svenska Elektriska Aktiebolaget, Vasteras, Sweden
Filed Jan. 24, 1969, Ser. No. 793,812
Claims priority, application Sweden, Dec. 2, 1968, 16,411/68
Int. Cl. G21c 3/32
U.S. Cl. 176—78                                13 Claims

ABSTRACT OF THE DISCLOSURE

In a fuel assembly for insertion from above into a nuclear reactor core a fuel rod bundle is arranged as a freely removable loose insert in a weight-carrying square sheathing tube, which has at its upper end connection members such as two diametrically opposed lifting lugs permitting a grab member in a lifting device to grab the sheathing tube for lifting the entire fuel assembly. The upper part of the sheathing tube is formed as springs supporting the fuel assembly laterally against an upper core grid and supporting the fuel rod bundle laterally against the sheathing tube wall.

BACKGROUND OF THE INVENTION (1) Field of the invention

The present invention relates to a fuel assembly for insertion from above into a nuclear reactor core, said assembly comprising a fuel rod bundle having a plurality of substantially parallel vertical fuel rods and a weight-carrying vertical sheathing tube surrounding said fuel rod bundle.

(2) The prior art

Fuel assemblies for boiling light water reactors, for example, have expensive sheathing tubes and in order to decrease the costs it has previously been proposed to construct the assembly so that the sheathing tube can be used again. According to one proposal a plurality of fuel rods in the bundle carry the lifting force during a refuelling operation. In this construction the sheathing tube is suspended from the top plate of the fuel rod bundle and can be removed when some screws have been loosened. The disadvantage with this construction is that the fuel rods, which are brittle after the radiation in the reactor, run the risk of being pulled apart when the assembly is removed from the reactor core and such an accident would have extremely serious consequences. According to another proposal the sheathing tube is the carrying part in the construction and is then screwed to the top plate of the bundle and provided with a bottom member on which the bottom plate of the bundle can rest. Even if in this case a few of the fuel rods have to carry the weight of this bundle, when the bundle is manipulated the sheathing tube will during a refuelling operation carry the weight of the entire assembly and take up all stresses, assuming that the sheathing tube is not greatly deformed.

It has been found that there is a great disadvantage with the known fuel assemblies having re-usable sheathing tubes, namely, that, in order to separate the sheathing tube and the fuel rod bundle from each other, the attachment means such as screws or the like which attach the sheathing tube to the fuel rod bundle must be loosened. Due to the risk of radiation this is normally carried out at a depth of six to ten meters in a storage tank filled with water. It is obvious that this causes considerable difficulty in manipulation, waste of time and necessitates complicated and expensive equipment.

SUMMARY OF THE INVENTION

One object of the invention is a fuel assembly in which the above mentioned disadvantages are avoided. This is made possible by arranging the fuel rod bundle as a freely removable loose insert in said sheathing tube, said tube having an upper end and connection members at said upper end, said connection members permitting a grab member in a lifting device to grab the sheathing tube for lifting the entire fuel assembly. With this construction of the fuel assemblies the advantage is gained that when the fuel assembly is lifted in the connection members of the sheathing tube (for example from the assembly position in the reactor core) the sheathing tube alone will carry the entire weight of the fuel assembly and take up all stresses. There is thus no risk that the irradiated brittle rods will be pulled apart during a refuelling operation. Furthermore, the sheathing tube and the spent fuel rod bundle can easily be separated in the storage tank by means of extremely simple and cheap equipment, without waste of time. It is possible to turn the fuel assembly upsidedown and shake out the fuel rod bundle, or possibly pull gently without first having to loosen any screws or the like.

The sheathing tube connection members for the lifting device preferably consist of lifting lugs in the form of extensions of the sheathing tube wall. The sheathing tube is preferably provided with a bottom part on which the fuel rod bundle stands. The fuel rod bundle may with advantage be provided with a separate connection member for the same or a second lifting device to facilitate its manipulation and, with certain fuel assemblies having substantially polygonal cross-section, for example substantially square cross-section, it is suitable for the connection members to be situated in two diagonally opposite corners of the cross-section.

A second object of the invention is a fuel assembly having a sheathing tube of the above described "bag-type" which is not screwed, riveted or in some other way rigidly connected to the top plate of the fuel rod bundle or the like, in which assembly wear between this top plate or corresponding part and the sheathing tube is prevented. This is achieved by providing the upper end of the fuel rod bundle with resilient members, preferably leaf springs arranged in pairs, supporting the fuel rod bundle laterally in the sheathing tube. The leaf springs or other resilient members are then suitably arranged substantially near the connection members of the sheathing tube, that is, with a square cross-section, preferably in the two corners having lifting lugs or corresponding connection members. The other two corners may then be provided with spring members supporting the fuel assembly or fuel rod bundle in an upper core lattice.

When manufacturing sheathing tubes having substantially polygonal, for example square, cross-section, which have connection members for lifting devices, these connection members may be shaped as two lifting lugs at diagonally opposite corners in the upper end of the sheathing tube, as mentioned above.

A third object of the invention, therefore, is a fuel assembly in which the remaining corners at the upper end of the sheathing tube are not completely machined away, but shaped as springs between the upper core lattice and the assembly or between the sheath tube and the fuel rod bundle or between all three of these components. Springs according to the latter embodiment can be shaped so that when the fuel rod bundle is inserted in the sheathing tube only a slight spring effect is obtained between the sheathing tube and the fuel rod bundle, but when the assembly is inserted in the core the springs are bent inwards by the core lattice and the tension between the fuel rod bundle and the sheathing tube increases. It is suitable for the sheathing tube to be manufactured in accordance with the method described in co-pending patent application Ser. No. 734,061 entitled "Method of manufacturing with a minimum deviation from a given basic dimension, a hollow relatively thin-walled body" filed on June 3, 1968 by Sven Brandberg et al. and assigned to the present assignee, in order to obtain the minimum deviation from a given basic dimension, which is particularly important in this case. Cold-worked Zircaloy, tempered Zr–2.5 percent Nb or the like is then suitable as material for the sheathing tube. By Zr–2.5 percent Nb is understood a zirconium alloy containing 2.5 percent by weight niobium. The contact point between the spring and the respective component may be shaped by stamping or binding out the spring material, but if a harder surface is required a boss can be riveted or welded on to form the contact part.

BRIEF DESCRIPTION OF THE DRAWINGS

The invention will now be further described with reference to the accompanying drawings which illustrate embodiments suitable for a boiling light water reactor by way of example.

DESCRIPTION OF THE PREFERRED EMBODIMENTS

Figure 1:
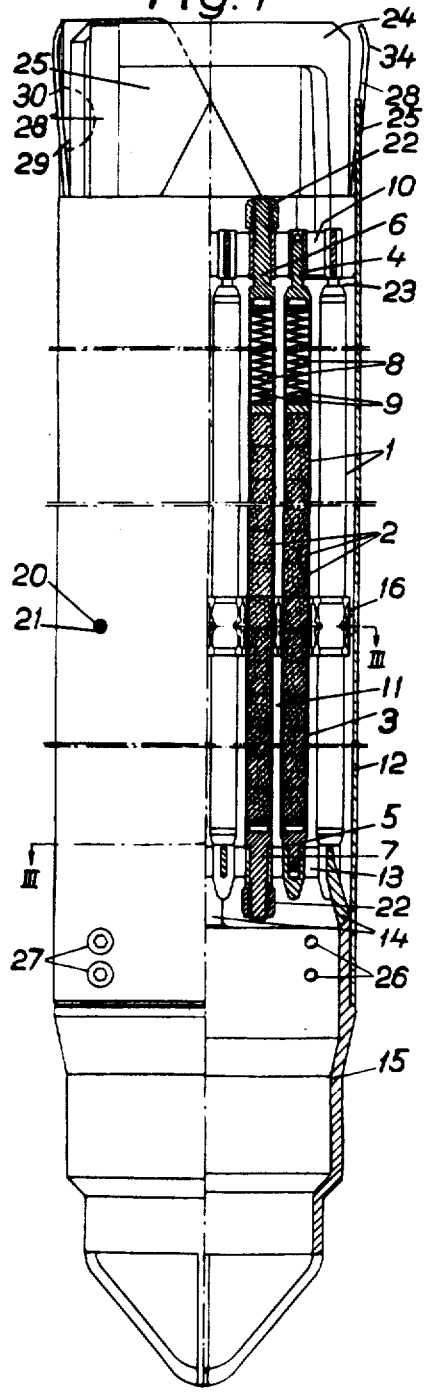
FIG. 1 shows a fuel assembly with a carrying and reusable sheathing tube, partly in longitudinal section along the line I—I in FIG. 2.

In the drawings 1 designates a number of fuel rods containing a ceramic nuclear fuel such as $UO_2$ in the form of sintered pellets 2. These are enclosed in a cladding tube 3 sealed at the ends by end plugs 4 and 5 or 6 and 7. The material in the cladding tube and end plugs may consist of a zirconium alloy such as Zircaloy. In the upper part of each rod a fission gas space 8 is arranged containing a helical spring 9. The fuel rods are arranged parallel to each other between a top plate 10 and a bottom member 13 and are provided with legs 14 and surrounded by a sheathing tube 12 having substantially square cross-section. The sheathing tube is provided with a bottom part 15 fitting into an assembly plate (core bottom). The legs 14 rest on the transition part 15. The top plate 10 and bottom plate 13 are grid-like and provided with recesses to receive projections arranged on the end plugs 4, 5, 6 and 7 to position the fuel rods at predetermined distances from each other.

So that the fuel rods, which may as an example exceed 3.5 m. in length and be 12.5 mm. wide, are not destroyed by vibrations caused by the coolant flowing through the fuel assembly, spacers 16 are arranged at several levels (only one level is shown), to keep the fuel rods in the position intended. Each of these spacers 16 comprises a number of spacer elements 17 arranged in a spacer frame 18. The spacer elements 17 may, for instance, be shaped as shown in U.S. Pat. No. 3,405,033 to Widell et al. of Oct. 8, 1968 or, even more advantageously, as shown in co-pending United States patent application Ser. No. 693,412, entitled "Spacer for Fuel Assemblies in a Nuclear Reactor" filed on Dec. 26, 1967 by Constan Glandin and assigned to the present assignee. The spacer frame 18 is centered in the sheathing tube 12 by means of spring means carried by the frame 18, for example leaf springs in the form of spring tongues 19 to a number of eight, thus in the case shown two springs for each side of the sheathing tube. In order to position the spacers 16 in relation to the sheathing tube 12, the spring tongues 19 which are arranged on two opposite sides of the spacer frame 18 are provided with male members in the form of short pegs or pins 20 intended to engage in female members arranged in the sheathing tube in the form of holes 21, somewhat larger than the pins. These holes 21 are suitably drilled with the help of a jig and it is also suitable for the spring tongue 19 to be shaped so that it covers the somewhat too large hole 21 and thus limits leakage.

The combination of a plurality of fuel rods with spacers and top and bottom plates is usually quite simply called a bundle and is designated 11 in the drawings. In the fuel assembly according to the drawings the bundle comprises sixty-four fuel rods, only two of which are weight-carrying. Of course a different number of rods, for example four, may be made weight-carrying if desired.

The end plugs 6 and 7 of the weight-carrying rods have thicker and longer projections which are threaded at the outer ends and can be locked by means of nuts 22 on the other side of the top and bottom plates, respectively, it being ensured that there is sufficient clearance for thermal expansion between the nuts 22 and the plates 10 and 13, respectively, and between the top plate 10 and the upper stops 23 of the rods 1. The low number of weight carrying rods is possible since their carrying function is only made use of during manipulation of the bundle 11, for example when inserting a bundle in the sheathing tube. When the fuel rod bundle 11 is being manipulated a handle 24 attached to the top plate 10 is used. For manipulating the fuel assembly the sheathing tube 12 is provided at its upper end with two connection members for a lifting device in the form of a pair of diagonally opposite lifting lugs 25 provided with holes 29, the lugs forming an extension of the sheathing tube 12. This is most clearly seen in FIGS. 5 to 10. The lifting lugs 25 are preferably made in one piece with the sheathing tube 12 but it is also possible to weld or rivet them on. Such riveting is preferably carried out on the outside of the sheathing tube and provides the possibility of choosing one material for the lifting lugs and another in the sheathing tube. Instead of providing the lifting lugs 25 or extension of the sheathing tube with holes 29 to enable the gripping members of the lifting device to grip and lift the sheathing tube, the lifting lugs or extension of the sheathing tube, respectively, may be provided with small bosses (not shown) arranged internally or externally. The holes 29 or bosses have at least one at least partially downwardly facing shoulder 30 each providing a grip for the grab member of the lifting device. If the bosses are arranged internally in the sheathing tube, the fuel rod bundle 11 is provided with corresponding recesses to permit simple dismantling of the fuel assembly. These bosses, however, have preferably a minimum extension from the inside of the sheathing tube 12 towards the longitudinal axis of the fuel assembly.

The bottom part 15 on which, as mentioned earlier, the fuel rod bundle 11 stands, is attached to the sheathing tube 12 by means of rivets 26 or screws 27. The screws 27 may be locked by punch marks, HeliCoil®Mid-Grip, or the like. When the fuel assembly is being taken out of the core there is no risk that the rods 1, which are fragile due to the radiation, will break, with the resultant serious consequences. A fuel assembly can be taken apart so that the sheathing tube 12 and bottom part 15 can be used again, after the pins 20 of the springs 19 have been pressed in in line with the inside of the sheathing tube 12. This can be achieved with the help of plates or the like provided with pins and pressed against the sides of the sheathing tube. Dismantling of the fuel assembly is even simpler if the spacers 16 instead are fixed in the conventional manner, in the axial direction by means of elongated longitudinal support members, or if they are not fixed at all, but held in position by friction against the rods. If it is feared that the few weight-carrying rods holding the bundle 11 together will not allow the bundle to be drawn out of the sheathing tube 12 without breaking, it is possible simply to turn the fuel assembly and shake out the bundle. The elongated longitudinal springs 28 arranged at the upper end of the fuel assembly serve to centre the fuel assembly in the upper core grid and may be attached to the top plate 10 or to the sheathing tube 12, and in the latter case be reused together with this tube. In neither case need they be removed when the fuel assembly is taken apart.

Figure 2:
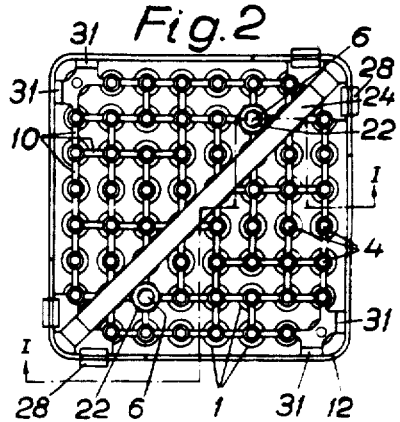
FIG. 2 shows an upper end view of the fuel assembly in FIG. 1.
Figure 3:
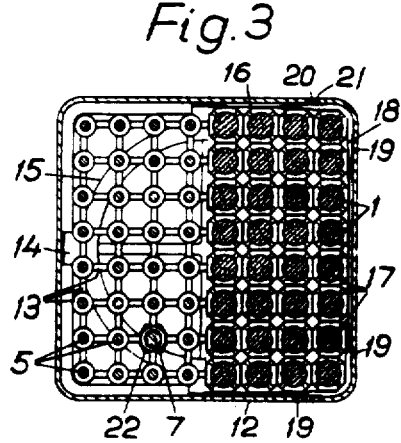
FIG. 3 shows a cross-section of the fuel assembly according to the line III—III in FIG. 1.
Figure 4:
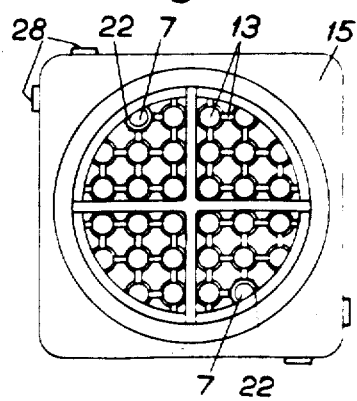
FIG. 4 shows a lower end view of the fuel assembly in FIG. 1.

Since the fuel rod bundle 11, as is clear from the above, stands as a loose insert in the sheathing tube 12, wear between the top plate 10 and sheathing tube 12 must be prevented. This is suitably done by means of leaf springs 31 applied in pairs at the top plate 10 and situated in the vicinity of the lifting lugs 25, see FIGS. 2 and 5.

Figure 5:
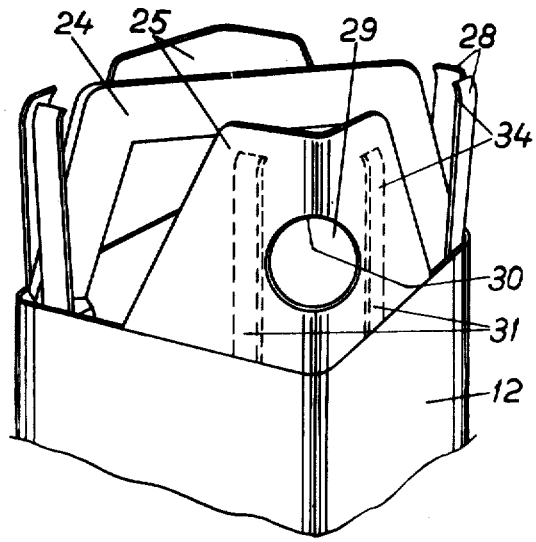
FIG. 5 shows in perspective the upper part of the fuel assembly in FIG. 1.
Figure 6:
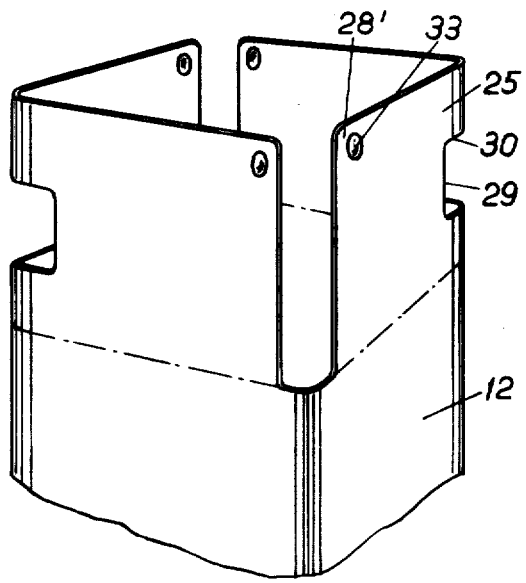
FIGS. 6–10 show similarly in perspective alternative embodiments of the upper part of the fuel assembly.
Figure 7:
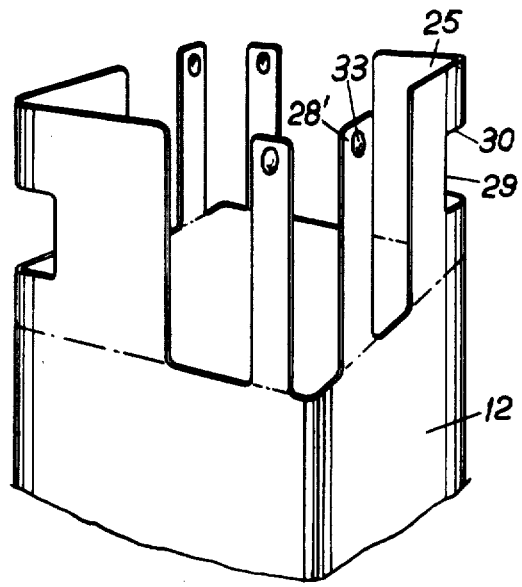
Figure 8:
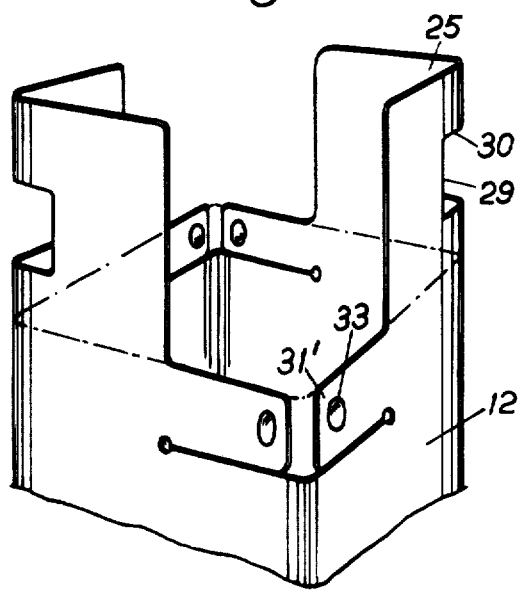
Figure 9:
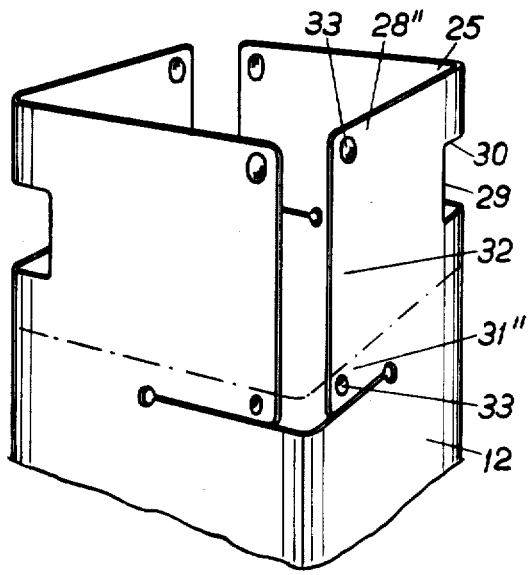
Figure 10:
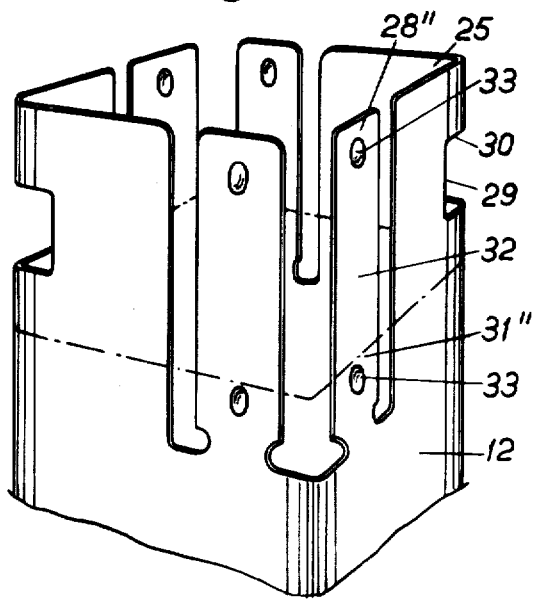

If the lifting lugs 25 are made integral with the sheathing tube 12 the remaining parts of the sheathing tube 12 above the upper end of the fuel rod bundle 11 can be machined away so that the top of the sheathing tube has substantially the shape shown in FIG. 5. Instead of machining away these parts completely they can be shaped as springs 28' between the core grid and the fuel assembly (FIGS. 6 and 7), as springs 31' between the fuel rod bundle 11 and the sheathing tube 12 (FIG. 8) or as springs 32 with a spring part 28'' between the core grid and the sheathing tube 12 and a spring part 31'' between the fuel rod bundle 11 and the sheathing tube 12 (FIGS. 9 and 10). The upper surface of the top plate 10 is shown in FIGS. 6–10 by a broken line. The contact point between the spring (28, 28', 28'' and 31, 31', 31'') and the respective component (top plate 10 or core grid respectively), may be shaped as a stamping 33 or bend 34 in the spring material, but if a stronger surface is required a raised surface can be riveted or welded on to form the contact point. The springs 32 in FIGS. 9 and 10 are bent so that when a fuel rod bundle 11 is inserted into the sheathing tube 12, only a slight spring effect between the fuel rod bundle 11 and the sheathing tube 12 is obtained, that is, between the top plate 10 and the spring parts 28'' on the springs 32. When the fuel assembly later is inserted into the core the springs 32 are bent inwards by the core grid and the spring effect between the fuel bundle 11 and sheathing tube 12 increases.

Instead of shaping an extension of the sheathing tube 12 as separate lifting lugs 25, the sheathing tube 12 may extend the same distance around the entire circumference of the cross section. In this case holes for the guiding springs 28 must be made in the wall of the sheathing tube.

We claim:

1. A fuel assembly for insertion from above into a nuclear reactor core, said assembly comprising a fuel rod bundle and a vertical sheathing tube surrounding said fuel rod bundle, the bundle having a plurality of substantially parallel vertical rods, a top plate, a bottom plate and a plurality of spacer grids, supporting means for said bottom plate, and means for attaching said supporting means to said sheathing tube, said fuel rods, said plates and said grids constituting a unit which is free to move within the sheathing tube longitudinally thereof and is thereby insertable in and removable from said sheathing tube, the sheathing tube having an upper end which, at least along part of its circumference, extends above said top plate and is furnished with connection means for engagement by a grab member in a lifting device for lifting the fuel assembly.

2. The fuel assembly of claim 1, wherein each connection member has at least one shoulder facing at least partly downwards constituting said connection means, said shoulder providing a grip for said grab member and having at most a negligible extension from the inside of the sheathing tube towards the longitudinal axis of the fuel assembly.

3. The fuel assembly of claim 1, wherein each of said connection members comprises an extension of the sheathing tube wall.

4. The fuel assembly of claim 1, wherein said connection members comprise lifting lugs.

5. The fuel assembly of claim 1, wherein said sheathing tube has a bottom part on which the fuel rod bundle stands.

6. The fuel assembly of claim 1, wherein said fuel rod bundle has a separate connection member for gripping by a lifting device.

7. The fuel assembly according to claim 1, wherein said sheathing tube has a substantially polygonal cross-section, and said connection members of said sheathing tube are situated in two diagonally opposite corners of said cross-section.

8. The fuel assembly of claim 1, wherein said fuel rod bundle has an upper end provided with spring members guiding said fuel rod bundle in said sheathing tube.

9. The fuel assembly of claim 8, wherein said spring members comprise leaf springs arranged in pairs.

10. The fuel assembly of claim 8, wherein said spring members are arranged adjacent said connection members of said sheathing tube.

11. The fuel assembly of claim 7, wherein said sheathing tube has wall parts projecting substantially axially over an upper end of said fuel rod bundle, said projecting wall parts being situated adjacent at least two diagonally opposite remaining corners of said polygonal cross section and comprising resilient support means to support said fuel assembly laterally against an upper core grid in a reactor core.

12. The fuel assembly of claim 7, in which at its upper end said sheathing tube has resilient parts abutting an upper end of said fuel rod bundle and extending towards at least two diagonally opposite remaining corners of the polygonal cross section, said resilient parts supporting said fuel rod bundle laterally in said sheathing tube.

13. The fuel assembly of claim 7, wherein said sheathing tube has substantially axially projecting wall parts situated at the upper end of said sheathing tube and near adjacent at least two diagonally opposite remaining corners of said polygonal cross section providing lateral support both for said fuel rod bundle against said sheathing tube and for said fuel assembly against an upper core grid in a reactor core.

References Cited
UNITED STATES PATENTS

| | | | |
|---|---|---|---|
| 3,255,091 | 6/1966 | Frisch | 176—78 |
| 3,338,791 | 8/1967 | Lass et al. | 176—78 X |
| 3,356,587 | 12/1967 | Hech | 176—78 |
| 3,368,945 | 2/1968 | Kelleret | 176—78 X |
| 3,379,619 | 4/1968 | Andrews et al. | 176—78 |
| 3,389,056 | 6/1968 | Frisch | 176—78 |
| 3,466,226 | 9/1969 | Lass et al. | 176—68 |

BENJAMIN R. PADGETT, Primary Examiner

G. G. SOLYST, Assistant Examiner

U.S. Cl. X.R.

176—30